US011595137B1

(12) United States Patent
Mohindra

(10) Patent No.: US 11,595,137 B1
(45) Date of Patent: Feb. 28, 2023

(54) SYSTEM AND METHOD OF MEASURING ERROR VECTOR MAGNITUDE IN THE TIME DOMAIN

(71) Applicant: Keysight Technologies, Inc., Santa Rosa, CA (US)

(72) Inventor: Rishi Mohindra, Milpitas, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/177,719

(22) Filed: Feb. 17, 2021

(51) Int. Cl.
*H04B 17/10* (2015.01)
*H04L 25/03* (2006.01)
*H04B 15/00* (2006.01)
*H04B 17/00* (2015.01)

(52) U.S. Cl.
CPC ......... *H04B 17/104* (2015.01); *H04B 15/005* (2013.01); *H04B 17/0085* (2013.01); *H04L 25/03821* (2013.01)

(58) Field of Classification Search
None
See application file for complete search history.

(56) References Cited

U.S. PATENT DOCUMENTS 6,484,268 B2 * 11/2002 Tamura ................. G11C 7/222
713/400
6,519,282 B1 * 2/2003 Huber ................. H04L 25/0305
375/348
6,826,226 B1 * 11/2004 Sahlin ............... H04L 25/03038
375/232
7,031,405 B1 * 4/2006 Touzni ................ H04L 27/0014
375/233

(Continued)

FOREIGN PATENT DOCUMENTS

AU 2007244882 A1 * 11/2008 ........... H03F 1/0205
AU 2004307920 B2 * 6/2009 ........... H04B 17/309

(Continued)

OTHER PUBLICATIONS

FFT based FIR filtering using overlap-add method, MathWorks product release R2006a, Mar. 2006 Available at https://www.mathworks.com/help/signal/ref/fftfilt.html (Year: 2006).*

(Continued)

*Primary Examiner* — Berhanu Tadese

(57) ABSTRACT an orthogonal frequency division multiplexed (OFDM) output signal produced by a device in response to an OFDM input signal is accessed. The OFDM input signal includes OFDM input symbols in the time domain and the OFDM output signal includes OFDM output symbols in the time domain. The OFDM output symbols are time-aligned to the OFDM input symbols and a phase of the OFDM output signal is de-rotated with respect to the OFDM input signal. A complex equalization filter is applied to the OFDM output symbols in the time domain to obtain an estimate of the OFDM input symbols A distortion signal of the OFDM output signal is determined by subtracting the estimate of the OFDM input symbols. An error vector magnitude (EVM) is determined by dividing a root mean square of the distortion, by a root mean square of the OFDM input signal.

20 Claims, 10 Drawing Sheets

(56) References Cited

U.S. PATENT DOCUMENTS

| | | | | |
|---|---|---|---|---|
| 7,151,797 B2 * | 12/2006 | Limberg | | H04N 5/211 |
| | | | | 375/232 |
| 7,342,981 B2 * | 3/2008 | Wongwirawat | | H04L 27/066 |
| | | | | 375/233 |
| 8,014,735 B2 * | 9/2011 | Vinayak | | H03F 1/0227 |
| | | | | 455/127.1 |
| 8,045,645 B2 * | 10/2011 | Bottomley | | H04L 25/0212 |
| | | | | 375/285 |
| 8,125,973 B2 * | 2/2012 | Fisher-Jeffes | | H04B 1/7117 |
| | | | | 375/150 |
| 9,136,942 B2 * | 9/2015 | Lindsay | | H04B 17/345 |
| 9,654,869 B2 * | 5/2017 | Reiss | | H04R 5/04 |
| 9,667,390 B2 * | 5/2017 | Ahmed | | H04L 27/2637 |
| 10,505,768 B2 * | 12/2019 | Abughalieh | | H04B 10/616 |
| 11,204,410 B2 * | 12/2021 | Jansen | | G01S 13/34 |
| 2009/0117865 A1 * | 5/2009 | Vinayak | | H03F 1/3247 |
| | | | | 455/127.1 |
| 2015/0304075 A1 * | 10/2015 | Ahmed | | H04L 1/206 |
| | | | | 375/228 |
| 2020/0309847 A1 * | 10/2020 | Lloyd | | G01R 31/2837 |
| 2022/0029777 A1 * | 1/2022 | Morita | | H04L 7/0079 |

FOREIGN PATENT DOCUMENTS

| | | | | | |
|---|---|---|---|---|---|
| AU | 2007244882 B2 | * | 12/2011 | | H03F 1/0205 |
| CA | 2250257 A1 | * | 5/1999 | | H04L 25/0305 |
| CA | 2650209 A1 | * | 11/2007 | | H03F 1/0205 |
| CA | 2428992 C | * | 10/2009 | | H04B 1/7105 |
| CA | 2542147 C | * | 2/2011 | | H04B 17/309 |
| CA | 2650209 C | * | 7/2013 | | H03F 1/0205 |
| CN | 101369823 A | * | 2/2009 | | H04B 1/7117 |
| CN | 101636317 B | * | 1/2013 | | B64C 1/00 |
| CN | 103414681 B | * | 1/2017 | | |
| CN | 106464619 A | * | 2/2017 | | H04B 17/0082 |
| CN | 209182624 U | * | 7/2019 | | G02F 1/1333 |
| DE | 19835760 A1 | * | 5/1999 | | H04L 25/0305 |
| DE | 112018006743 T5 | * | 10/2020 | | H04B 17/318 |
| EP | 884732 A2 | * | 12/1998 | | G11C 11/4076 |
| EP | 1032170 A1 | * | 8/2000 | | H04L 25/03012 |
| EP | 1032170 B1 | * | 1/2005 | | H04L 25/03012 |
| EP | 1976138 A2 | * | 10/2008 | | H04B 1/7117 |
| EP | 2165425 B1 | * | 6/2019 | | H04B 1/71052 |
| JP | 2003229762 A | * | 8/2003 | | |
| JP | 2005338165 A | * | 12/2005 | | |
| JP | 2018150241 A | * | 9/2018 | | |
| JP | 6484268 B2 | * | 3/2019 | | |
| JP | 2019074519 A | * | 5/2019 | | G01R 29/0871 |
| JP | 6867346 B2 | * | 4/2021 | | G01R 29/0871 |
| RU | 2377724 C2 | * | 12/2009 | | H04B 1/7085 |
| RU | 2438260 C2 | * | 12/2011 | | H04B 7/2615 |
| RU | 2567215 C2 | * | 11/2015 | | H04B 7/2615 |
| WO | WO-0233923 A2 | * | 4/2002 | | H04L 25/03038 |
| WO | WO-2005048548 A2 | * | 5/2005 | | H04L 25/0216 |
| WO | WO-2009061583 A1 | * | 5/2009 | | H03F 1/0227 |
| WO | WO-2013167884 A1 | * | 11/2013 | | G10H 1/02 |
| WO | WO-2020167747 A1 | * | 8/2020 | | H04B 7/0465 |
| WO | WO-2021229197 A1 | * | 11/2021 | | |
| WO | WO-2021249650 A1 | * | 12/2021 | | |

OTHER PUBLICATIONS

Dahlman et al., Uplink Physcal-Layer Processing in 4G LTE, LTE-Advanced for Mobile Broadband, 2011 (Year: 2011).*

A. Mustapha and S. Yeldener, "An adaptive post-filtering technique based on a least squares approach," 1999 IEEE Workshop on Speech Coding Proceedings. Model, Coders, and Error Criteria (Cat. No. 99EX351), 1999, pp. 156-158, doi: 10.1109/SCFT.1999.781516. (Year: 1999).*

* cited by examiner

SYSTEM AND METHOD OF MEASURING ERROR VECTOR MAGNITUDE IN THE TIME DOMAIN

BACKGROUND

Devices and systems which transmit radio frequency (RF) signals ("RF devices"), such as mobile telephones, wireless local area network (WLAN) transceivers, etc. are typically subject to a variety of requirements or specifications regarding the RF signals which they emit, for example governing out of channel emissions and out of band emissions, including spurious signals and harmonics, distortion, noise, etc.

One important parameter used to quantify the performance of such RF devices, and in particular devices which transmit digitally-modulated RF signals, is the error vector magnitude (EVM) of a transmitted signal. A digitally-modulated signal transmitted by an ideal RF transmitter would have all constellation points of the transmitted signal precisely at their ideal locations. However, with real RF devices and systems, various factors in the implementation (such as modulation distortion, phase noise, carrier leakage, low image rejection ratio, etc.) can cause the actual constellation points to deviate from their ideal locations. Informally, EVM can be considered to be a measure of how far the actual constellation points are deviating from their ideal locations.

Distortion, noise, spurious signals, etc. can all degrade EVM performance, and therefore EVM provides a comprehensive measure of the quality of a signal transmitted by an RF device for use in digital communications. EVM can be measured by specialized equipment, which receives an RF signal from an RF device, and demodulates the received signal in a similar way to how a real radio demodulator does it.

Often an RF signal analyzer may be employed to measure EVM for an RF device. When testing an RF device, an output of a device under test ("DUT") may be connected to an input of the RF signal analyzer (for example, through a direct connection or via an antenna), and an RF signal transmitted from the transmitter of the RF device may be captured using the RF signal analyzer. Typically, the RF signal analyzer produces a baseband signal corresponding to the captured RF signal. The EVM of the RF signal transmitted from the DUT may be determined by comparing the baseband signal to a reference signal. Where the transmitted signal is an orthogonal frequency division multiplexed (OFDM) signal, conventional methods for measuring the EVM involve transforming the baseband signal and the reference signal to the frequency domain, and comparing the two transformed signals in the frequency domain.

In other situations, the device under test (DUT) may be an RF power outputting and/or translating device such as a power amplifier (PA). In these situations, an input of the DUT may be connected to an output of a RF signal generator and an output of the DUT may be connected to an input of an RF signal analyzer. The RF signal generator supplies an RF signal (e.g., that carries an OFDM signal) to the RF power outputting and/or translating device. The RF power outputting and/or translating device processes the supplied RF signal to produce an RF output signal. The RF signal analyzer captures the RF output signal and produces a baseband signal. Again, conventional methods for computing error vector magnitude dictate transforming the baseband signal and a corresponding reference signal to the frequency domain, and comparing the two transformed signals. Here the EVM characterizes the quality of the RF output signal from the power translating device.

As noted above, the EVM measurement typically employs a reference signal. In some cases, the reference signal may be determined from the baseband signal produced by the RF signal analyzer. In other cases, the EVM measurement may rely on a previously stored reference signal. For example, prior to the EVM measurement of a DUT, the signal analyzer may receive the reference signal from the DUT, or from the signal generator in a case where an RF power outputting and/or translating device is being tested, and store the reference signal in memory for use in the EVM measurement.

There are some issues which arise with conventional EVM measurement techniques which operate in the frequency domain. For one thing, frequency domain EVM measurement arrangements require a demodulator. Also, it is desired to make the implementation loss of an EVM measurement setup to be as low as possible, but the implementation losses for frequency domain EVM measurement techniques are sometimes higher than desired. Furthermore, in some cases, a DUT may be subjected to a plurality of test iterations, and the EVM may be determined for each of the iterations so that the average EVM for the RF signals transmitted from the DUT may be determined. The total time required to test the DUT thus depends on the efficiency of the EVM measurement technique. Any improvement in this efficiency would decrease testing time and increase the number of DUTs that can be evaluated per unit time.

Accordingly, it would also be desirable to provide a system and method for determining the EVM of a DUT which may provide some advantages over existing systems and methods which operate in the frequency domain. In particular, it may be beneficial to provide a system and method of determining the EVM of a DUT, which operate in the time domain.

SUMMARY

As disclosed herein a method may comprise utilizing a processor and memory to: access an orthogonal frequency division multiplexed (OFDM) output signal produced by a device under test (DUT) in response to an OFDM input signal, wherein the OFDM input signal comprises a series of OFDM input symbols in the time domain and the OFDM output signal comprises a series of OFDM output symbols in the time domain; time align the OFDM output symbols to the OFDM input symbols and de-rotate a phase of the OFDM output signal with respect to the OFDM input signal; apply a complex equalization filter to the OFDM output symbols in the time domain to obtain an estimate of the OFDM input symbols; determine a distortion signal of the OFDM output signal by subtracting the estimate of the OFDM input symbols from the OFDM input symbols; determine an error vector magnitude (EVM) by dividing a root mean square of the distortion, by a root mean square of the OFDM input signal; and store the EVM in the memory.

In some embodiments, the complex equalization filter is a Yule-Walker filter, and the method further comprises the processor determining filter coefficients of the Yule-Walker filter which minimize a mean square error that is the distortion signal.

In some versions of these embodiments, determining filter coefficients of the Yule-Walker filter comprises the processor solving a matrix equation $b=(T^{-1}*v)$, where v is cross-correlation vector of the OFDM input symbols and the OFDM output symbols, where T is a Toeplitz matrix of an autocorrelation vector of the OFDM output symbols, and where b is a vector comprising the filter coefficients of the complex equalization filter.

In some versions of these embodiments, the processor solving the matrix equation $b=(T^{-1}*v)$ includes the processor determining $T^{-1}$ from the Toeplitz matrix T by applying a Levinson-Durbin algorithm.

In some embodiments, the complex equalization filter is a least squares filter and the method further comprises the processor determining filter coefficients of the least squares filter which minimize a mean square error of the distortion signal.

In some versions of these embodiments, determining the filter coefficients of the least squares filter comprises the processor solving a matrix equation of the form: $b=(R^H*R)^{-1}*R^H*x$, where x is a vector of the OFDM input symbols; R is a matrix of the OFDM output symbols, with each column in R being a one-clock increased delayed version of the immediately previous column; where H indicates the Hermitian operation; and where b is a vector comprising the filter coefficients of the least squares filter.

In some embodiments, the method further comprises the processor nulling out unused tones in the OFDM input symbols and the estimated OFDM input symbols prior to determining the distortion signal of the OFDM output signal.

In some embodiments, the method further comprises the processor, prior to applying the complex equalization filter to the OFDM output symbols: canceling phase noise for each OFDM output symbol; removing jitter from each OFDM output symbol; and coherently averaging the OFDM output symbols over time using repeated copies of the OFDM output signal.

In some embodiments, the OFDM input signal is disposed in a first input sub-band portion of a wider bandwidth overall OFDM input signal which includes at least the first input sub-band portion and a second input sub-band portion, and wherein the OFDM output signal is disposed in a first output sub-band portion of a wider bandwidth overall OFDM output signal which includes at least the first output sub-band portion and a second output sub-band portion, and the method further comprises: determining a second EVM for a second OFDM output signal in the second output sub-band portion, and stitching together the EVM and the second EVM to determine an overall EVM for the overall OFDM output signal.

In some embodiments, the method further comprises applying pre-distortion to the OFDM input signal prior to applying the OFDM input signal to the DUT, and the complex equalization filter reduces out of band spectral regrowth of the OFDM output signal due to the pre-distortion.

As disclosed herein an apparatus may comprise: an input terminal and a processor. The input terminal is configured to receive an orthogonal frequency division multiplexed (OFDM) output signal produced by a device under test (DUT) in response to an OFDM input signal, wherein the OFDM input signal comprises a series of OFDM input symbols in the time domain and the OFDM output signal comprises a series of OFDM output symbols in the time domain. The processor is configured to: access the OFDM output signal; time align the OFDM output symbols to the OFDM input symbols and de-rotate a phase of the OFDM output signal with respect to the OFDM input signal; apply a complex equalization filter to the OFDM output symbols in the time domain to obtain an estimate of the OFDM input symbols; determine a distortion signal of the OFDM output signal by subtracting the estimate of the OFDM input symbols from the OFDM input symbols; determine an error vector magnitude (EVM) by dividing a root mean square of the distortion, by a root mean square of the OFDM input signal; and store the EVM in a memory.

In some embodiments, the complex equalization filter is a Yule-Walker filter, and the processor is further configured to determine filter coefficients of the Yule-Walker filter which minimize a mean square error of the distortion signal.

In some versions of these embodiments, the processor is further configured to determine filter coefficients of the Yule-Walker filter by solving a matrix equation: $b=(T^{-1}*v)$, where v is cross-correlation vector of the OFDM input symbols and the OFDM output symbols, where T is a Toeplitz matrix of an autocorrelation vector of the OFDM output symbols, and where b is a vector comprising the filter coefficients of the complex equalization filter.

In some embodiments, the complex equalization filter is a least squares filter and the processor is configured to determine filter coefficients of the least squares filter which minimize a mean square error of the distortion signal.

In some versions of these embodiments, the processor is further configured to determine the filter coefficients of the least squares filter by solving a matrix equation of the form: $b=(R^H*R)^{-1}*R^H*x$, where x is a vector of the OFDM input symbols; R is a matrix of the OFDM output symbols, with each column in R being a one-clock increased delayed version of the immediately previous column; where H indicates the Hermitian operation; and where b is a vector comprising the filter coefficients of the least squares filter.

In some embodiments, the processor is further configured to null out unused tones in the OFDM input symbols and the estimated OFDM input symbols prior to determining the distortion signal of the OFDM output signal.

In some embodiments, the processor is further configured to, prior to applying the complex equalization filter to the OFDM output symbols: cancel phase noise for each OFDM output symbol; remove jitter from each OFDM output symbol; and coherently average the OFDM output symbols over time using repeated copies of the OFDM output signal.

In some embodiments, the apparatus further comprises: a signal generator which is configured to generate the input OFDM signal and provide the input OFDM signal to the DUT; and a display which is configured to display the EVM.

In some versions of these embodiments: the OFDM input signal is disposed in a first input sub-band portion of a wider bandwidth overall OFDM input signal which includes at least the first input sub-band portion and a second input sub-band portion; the OFDM output signal is disposed in a first output sub-band portion of a wider bandwidth overall OFDM output signal which includes at least the first output sub-band portion and a second output sub-band portion, and the processor is further configured to: determine a second EVM for a second OFDM output signal in the second output sub-band portion, and stitch together the EVM and the second EVM to determine an overall EVM for the overall OFDM output signal.

In some embodiments, pre-distortion is applied to the OFDM input signal prior to applying the OFDM input signal to the DUT, and the complex equalization filter reduces out of band spectral regrowth of the OFDM output signal due to the pre-distortion.

As disclosed herein, a tangible non-volatile storage medium may have stored thereon instructions which when executed by a processor cause the processor to: access an orthogonal frequency division multiplexed (OFDM) output signal produced by a device under test (DUT) in response to an OFDM input signal, wherein the OFDM input signal comprises a series of OFDM input symbols in the time domain and the OFDM output signal comprises a series of OFDM output symbols in the time domain; time align the OFDM output symbols to the OFDM input symbols and de-rotate a phase of the OFDM output signal with respect to the OFDM input signal; apply a complex equalization filter to the OFDM output symbols in the time domain to obtain an estimate of the OFDM input symbols; determine a distortion signal of the OFDM output signal by subtracting the estimate of the OFDM input symbols from the OFDM input symbols; determine an error vector magnitude (EVM) by dividing a root mean square of the distortion, by a root mean square of the OFDM input signal; and store the EVM in a memory.

In some embodiments, the complex equalization filter is a Yule-Walker filter, and the instructions further cause the processor to determine filter coefficients of the Yule-Walker filter which minimize a mean square error of the distortion signal.

In some embodiments, determining filter coefficients of the Yule-Walker filter comprises the processor solving a matrix equation $b=(T^{-1}*v)$, where v is cross-correlation vector of the OFDM input symbols and the OFDM output symbols, where T is a Toeplitz matrix of an autocorrelation vector of the OFDM output symbols, and where b is a vector comprising the filter coefficients of the complex equalization filter.

In some embodiments, the complex equalization filter is a least squares filter and the instructions further cause the processor to determine filter coefficients of the least squares filter which minimize a mean square error of the distortion signal.

In some versions of these embodiments, determining the filter coefficients of the least squares filter comprises the processor solving a matrix equation of the form: $a=(R^H*R)^{-1}*R^H*x$, where x is a vector of the OFDM input symbols; R is a matrix of the OFDM output symbols, with each column in R being a one-clock increased delayed version of the immediately previous column; where H indicates the Hermitian operation; and where b is a vector comprising the filter coefficients of the least squares filter.

BRIEF DESCRIPTION OF THE DRAWINGS

The example embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
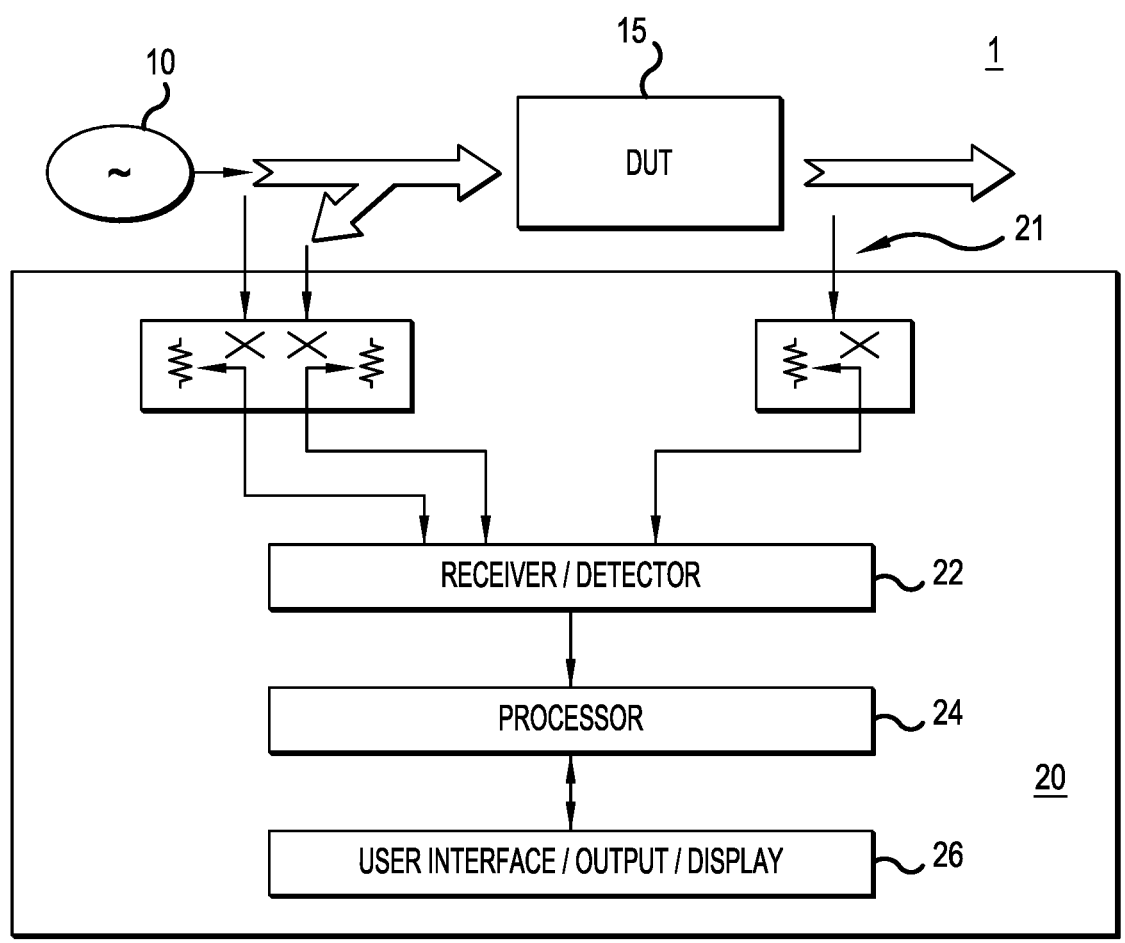
FIG. 1 is a functional block diagram illustrating an example embodiment of a network analyzer which may be employed for measuring error vector magnitude (EVM) performance of a device under test (DUT).
Figure 2:
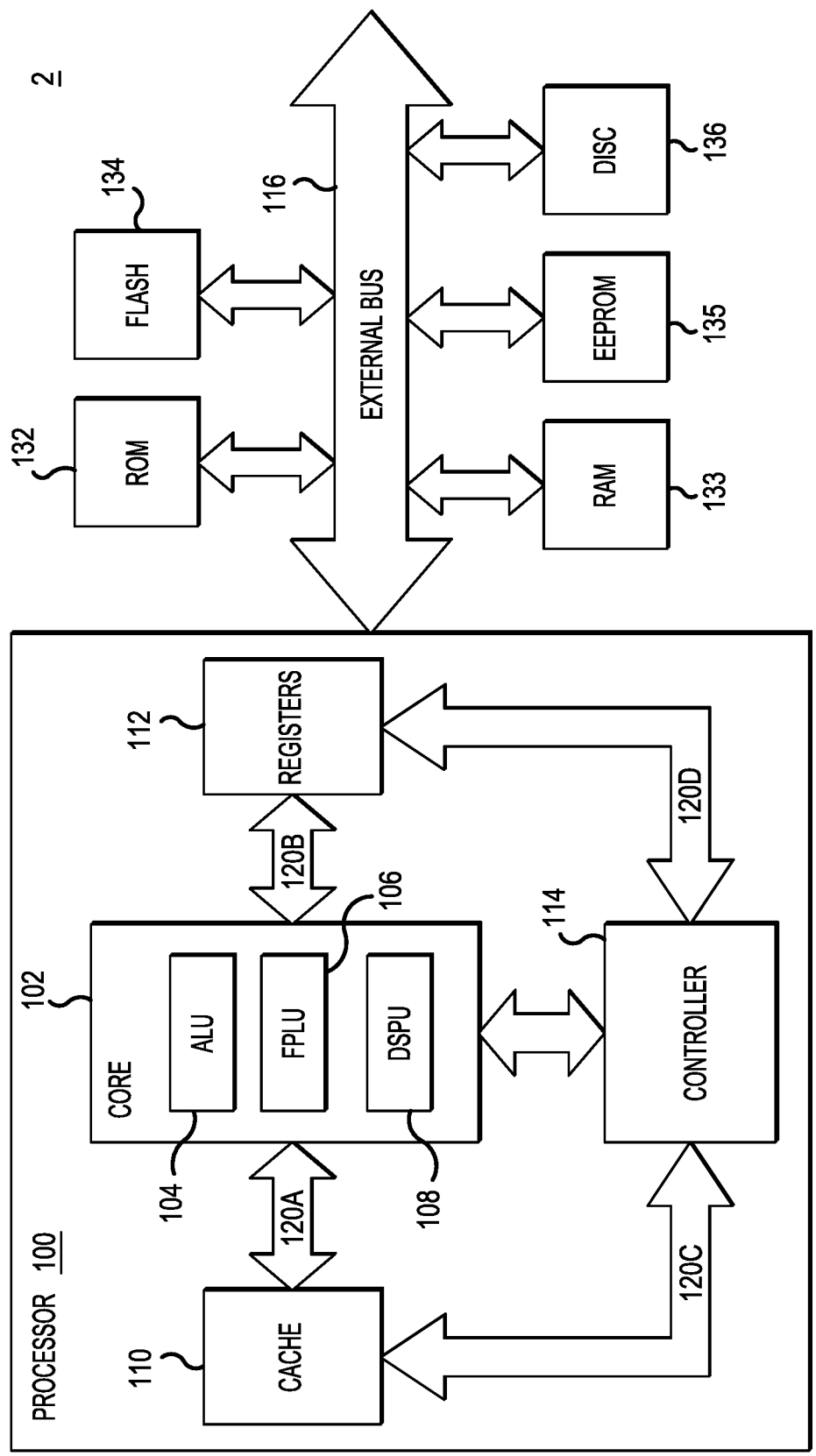
FIG. 2 shows an example embodiment of a processing system which may be employed in systems disclosed herein and to perform methods disclosed herein.

Before describing details of systems and methods for measuring an error vector magnitude (EVM) of a device under test, such as an amplifier or wireless mobile device, in the digital domain, to provide some context we first describe with respect to FIGS. 1 and 2 aspects of some example devices which may be employed in these systems and methods.

FIG. 1 is a function block diagram illustrating an example embodiment of a network analyzer 1 which may be employed for measuring error vector magnitude (EVM) performance of a device under test (DUT) 15, in particular an RF device. Here, DUT 15 may be a wireless phone, a WiFi transceiver, a power amplifier, or other another device which transmits an RF signal. Network analyzer 1 includes two major components: a signal generator 10 and a signal analyzer 20. Signal generator 10 may generate an RF input signal for DUT 15, and signal analyzer 20 may receive an RF output signal from DUT 15.

Signal analyzer 20 may include a receiver or detector 22, a processor 24, and a user interface 26 which may include a display and/or a data output, such as standard data interface, an Internet connection, a wireless connection (e.g., Wi-Fi), etc.

FIG. 1 also shows directional couplers associated with signal analyzer 20. In some cases, these may be omitted, especially when signal analyzer 20 only receives and analyzes the output RF signal from DUT 15, which in that case may be connected directly to receiver/detector 22 through a cable, or in some cases through an antenna connected to input port 21 and receiver/detector 22.

FIG. 2 shows an example embodiment of processing system 2 which may be employed in systems disclosed herein and to perform methods disclosed herein. Processing system 2 includes a processor 100 connected to one or more external storage devices via an external bus 116.

Processor 100 may be any suitable processor type including, but not limited to, a microprocessor (e.g., a general-purpose microprocessor) a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

Processor 100 may include one or more cores 102. Core 102 may include one or more arithmetic logic units (ALU) 104. In some embodiments, core 102 may include a floating-point logic unit (FPLU) 106 and/or a digital signal processing unit (DSPU) 108 in addition to or instead of ALU 104.

Processor 100 may include one or more registers 112 communicatively coupled to core 102. Registers 112 may be implemented using dedicated logic gate circuits (e.g., flip-flops) and/or any memory technology. In some embodiments registers 112 may be implemented using static memory. The register may provide data, instructions and addresses to core 102.

In some embodiments, processor 100 may include one or more levels of cache memory 110 communicatively coupled to core 102. Cache memory 110 may provide computer-readable instructions to core 102 for execution. Cache memory 110 may provide data for processing by core 102. In some embodiments, the computer-readable instructions may have been provided to cache memory 110 by a local memory, for example, local memory attached to external bus 116. In some embodiments, the computer-readable instructions may be stored on a tangible non-volatile storage medium such as disc 136 and may be transferred from disc 136 to local memory and from there to cache memory 110 for execution by processor 100. Here, disc 136 may be an optical or magnetic storage device. Cache memory 110 may be implemented with any suitable cache memory type, for example, metal-oxide semiconductor (MOS) memory such as static random-access memory (SRAM), dynamic random-access memory (DRAM), and/or any other suitable memory technology.

Processor 100 may include a controller 114, which may control input to processor 100 from other processors and/or components included in a system and/or outputs from processor 100 to other processors and/or components included in the system. Controller 114 may control the data paths in ALU 104, FPLU 106 and/or DSPU 108. Controller 114 may be implemented as one or more state machines, data paths and/or dedicated control logic. The gates of controller 114 may be implemented as standalone gates, FPGA, ASIC or any other suitable technology.

Registers 112 and cache 110 may communicate with controller 114 and core 102 via internal connections 120A, 120B, 120C and 120D. Internal connections may be implemented as a bus, multiplexor, crossbar switch, and/or any other suitable connection technology.

Inputs and outputs for processor 100 may be provided via external bus 116, which may include one or more conductive lines. External bus 116 may be communicatively coupled to one or more components of processor 100, for example controller 114, cache 110, and/or register 112.

External bus 116 may be coupled to one or more external memories. The external memories may include Read Only Memory (ROM) 132. ROM 132 may be a masked ROM, Electronically Programmable Read Only Memory (EPROM) or any other suitable technology. The external memory may include Random Access Memory (RAM) 133. RAM 133 may be a static RAM, battery backed up static RAM, Dynamic RAM (DRAM) or any other suitable technology. The external memory may include Electrically Erasable Programmable Read Only Memory (EEPROM) 135. The external memory may include Flash memory 134.

Although a detailed description of processing system 2 which may be employed in systems and to perform methods disclosed herein has been described above as a concrete example, in general some or all of the operations described herein may be performed by a general-purpose computer with any processor and memory, in particular a computer which operates with a standard operating system such as WINDOWS®, MACINTOSH® Operating System ("macOS"), UNIX, Linux, etc.

Described in greater detail below are two embodiments of a system and method for modulation distortion EVM measurement in the time domain based on utilizing an equalization filter whose coefficients are adapted to produce a MMSE (minimum mean square error) between an input signal and an estimate of the input signal derived from an output signal which includes noise and distortion. In some cases, these techniques may provide improvement in the implementation loss or EVM over previous techniques which operate in the frequency domain. A first embodiment of this technique is based on a Yule-Walker estimation method using a Toeplitz matrix. A second embodiment is based on a least squares solution.

In the discussion to follow: x is an input signal to a DUT; y is an output signal of the DUT; and $x_{estimated}$ is an estimate of the input signal x produced from the output signal y.

The Yule-Walker estimation method in the time domain uses MMSE (minimum mean square error) based equalization filtering extracted from the time-domain auto correlation $R_{yy}$ of the distorted+noisy output waveform y from the DUT, and the cross correlation $R_{yx}$ between the distorted+noisy output waveform y and the ideal input waveform x of the DUT, using the operations T=Toeplitz($R_{yy}$), a square matrix, followed by $b=(T^{-1} \cdot R_{yx})^*$, where b is a vector of the estimated filter coefficients of a finite impulse response filter employed as an equalizer. The optimum estimated signal is then given as $x_{estimated}$=fftfilt(b,y), where the fftfilt operation is as defined by MATLAB. A detailed description of the fftfilt operation is provided in the APPENDIX attached below at the end of the Detailed Description and before the claims. The input referred distortion+noise error is then: $d=x-x_{estimated}$.

Here, the coefficients of the equalization filter are complex, and the equalization filter is therefore able to equalize an asymmetric pass band frequency response (between +ve and −ve frequencies) in homodyne systems. The tap-length L of the b coefficients of the equalization filter may be set to the number of frequency points required to equalize the signal over the bandwidth of $F_s$, which is the sampling frequency. The lengths of $R_{yy}$ and $R_{yx}$ are also set to L.

In prior frequency domain techniques, it was generally necessary to smoothen the equalization filter in the frequency domain in order to improve the EVM. In the time domain method disclosed here this is not required, as it already produces the required L-tap filter meeting MMSE. Furthermore, the value L can be made significantly larger to improve EVM marginally. Also, there is no need of frequency response calibration or interpolation or averaging as in frequency domain based methods, as the technique disclosed here directly arrives at the optimum matched filter coefficients b for all S/(N+D) conditions. Thus, there is no need for "calibration" of the equalization filter coefficients b under high S/(N+D) (signal-to-noise+distortion) conditions, as the filter coefficients b are always computed under the operating S/(N+D) condition.

Carrier phase shift de-rotation and alignment between x and $x_{estimated}$ may be easily done using index and complex value of the peak of $R_{yx}$.

EVM may be computed only for occupied spectrum, just as in frequency domain based methods. It may be computed in the frequency domain after the time-domain MMSE equalization—i.e., unused tones are nulled out in both fft(d) and fft(x) before the ratio of their RMS value is taken for the EVM. Tone nulling is straightforward and automated, requiring no a priori knowledge of the modulation or tone locations.

In some embodiments, phase noise may be tracked by dividing the input and output signals into smaller segments, taking their segment-wise cross correlation to determine the phase fluctuation per segment, and then de-rotating each measured signal segment by the opposite phase fluctuation. Initially the measured output signal may be time aligned with the input signal using cross correlation to determine the output signal lag in clock samples.

In some embodiments, band stitching can be employed when the bandwidth of the signal analyzer is less than the bandwidth of the RF signal of the DUT. According to this method, the RF signal bandwidth is subdivided into overlapped sub-bands that are each less than or equal to the signal analyzer's bandwidth. The signal analyzer filters each of the sub-band signals for which modulation distortion is performed relative to the counterpart of the source signal identically filtered sub-band. The modulation distortion includes the EVM versus frequency, as well as the channel frequency response. The EVMs and channel responses of the sub-bands are then stitched together to form the composite response of the full-band RF signal of the DUT. Potential phase discontinuity at boundaries of adjacent sub-bands in the modulation distortion responses are resolved by subtracting out the phase jump going from left to right, and accumulating the phase jumps as we progress. The jumps are computed at the simultaneous maximum amplitude overlap frequency bin.

In some embodiments, a compact test signal, which is a subset of the original signal, is employed, and optionally with a similar time-domain cumulative distribution function (CDF).

In some embodiments, a coherently averaged signal is employed for determining the modulation distortion EVM due to the distortion component. In some embodiments, based on the known noise figure of the DUT, the thermal noise based EVM component of the DUT can be determined and added to the distortion based EVM component using power addition, to get the total DUT EVM.

Some embodiments which employ the Yule-Walker technique take a very long tap-length for b (e.g., 1 k to 10 k) to improve the EVM accuracy, and to optionally smoothen the curve using spline fitting, or neighborhood filtering.

Some embodiments which employ the Yule-Walker technique: (1) interpolate; and (2) smoothen the values of the coefficients b of the equalization filter in either the time domain or the frequency domain using one of many techniques, including but not limited to: (a) polynomial curve fitting, (b) spline fitting, or (c) robust local regression based interpolation.

Some embodiments of the Yule-Walker method utilize $R_{xy}*$ instead of $R_{yx}$, as the two are mathematically equivalent.

Figure 3:
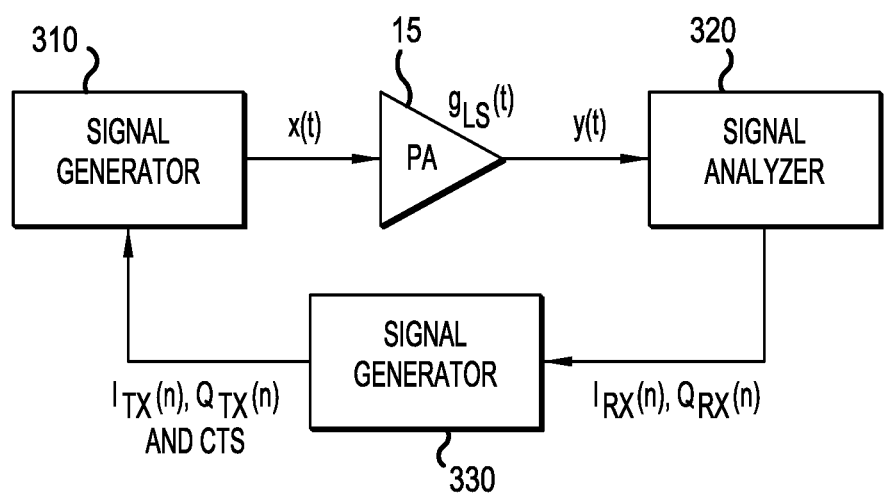
FIG. 3 is a diagram for illustrating and defining various signals and measurement parameters which pertain to the present disclosure.

FIG. 3 is a diagram for illustrating and defining various signals and measurement parameters which pertain to the present disclosure.

FIG. 3 shows a signal generator 310 (e.g., signal generator 10 of FIG. 1), a power amplifier (PA) as an example of a device under test (DUT) 15, a signal analyzer 320 (e.g., signal analyzer 20 of FIG. 1), and a modulation distortion evaluator 330. FIG. 3 shows an input signal x(t) (e.g., an orthogonal frequency division multiplexed (OFDM) signal) being supplied to an input of DUT 15 which has a time-varying transfer function $g_{LS}(t)$ and produces an output signal y(t) (e.g., also an OFDM signal). The output of signal analyzer 520 can be represented as I and Q components, $I_{RX}(t)$ and $Q_{RX}(t)$, and the output of modulation distortion evaluator 330 which is supplied to signal generator 310 is $I_{RX}(t)$ and $Q_{RX}(t)$ and a compact test signal (CTS).

Here, in the time domain:

$$y(t)=g_{LS}(t)*x(t)+d_{OUT}(t). \qquad (1)$$

In the frequency domain:

$$Y(f)=G_{LS}(f)\cdot X(f)+D_{OUT}(f). \qquad (2)$$

Referring this back to the input:

$$Y(f)/G_{LS}(f)=X(f)D_{OUT}(f)/G_{LS}(f), \text{ or:} \qquad (3)$$

$$X(f)=H(f)\cdot Y(f)+D_{IN}(f), \qquad (4)$$

where $H(f)=1/G_{LS}(f)$ and can be determined by an equalizer, as discussed below, and $$D_{IN}(f)=-D_{OUT}(f)G_{LS}(f). \qquad (5)$$

The noise power ratio (NPR) at the output is:

$$NPR(f)=D_{OUT}(f)/Y(f). \qquad (6)$$

Meanwhile, by definition:

$$EVM(f)=D_{IN}(f)/X(f), \qquad (7)$$

where EVM(f) is power spectral density of the EVM at the input referred to an ideal signal X(f). And:

$$EVM=RMS[D_{IN}(f)]/RMS[X(f)] \qquad (8)$$

Here, the final EVM may be calculated in the frequency domain for only the occupied subcarriers or spectrum.

A problem to be addressed here is how to find $g_{LS}(t)$ and $d_{OUT}(t)$ under large signal modulation of x(t).

In one embodiment, a system and method determine the best-fit estimate $x_{estimated}(t)$ of the input signal x(t) extracted from the noisy and distorted output signal y(t) through a "complex" equalization filtering process, g(t), so that the remainder noise & distortion d(t) is minimized. Essentially g(t) equalizes y(t) to x(t) as best as possible and has the inverse channel filter response. Here t is discrete time.

Figure 4:
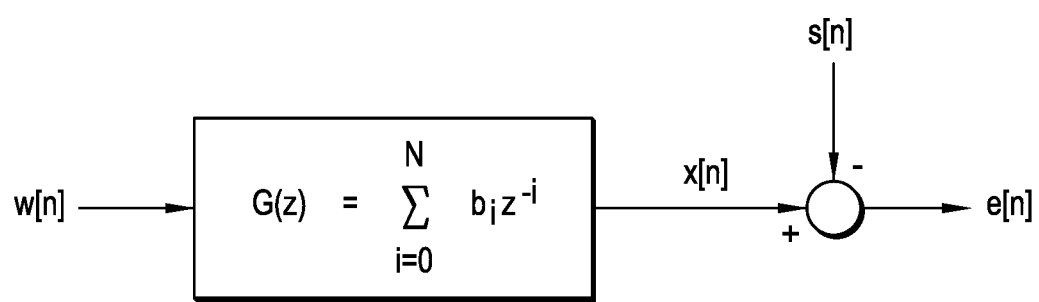
FIG. 4 is a diagram for explaining features of an equalizer which may be employed in a system and method for measuring the error vector magnitude (EVM) of a DUT.

FIG. 4 is a diagram for explaining features of an equalizer which may be employed in a system and method for measuring the EVM of a DUT. In FIG. 4: s[n] is an ideal output signal (e.g., an OFDM signal); w[n] is a noisy & distorted signal: w[n]=s[n]+d[n]; e[n] is an error signal; and G(z) is a Yule-Walker equalization filter ($1/g_{LS}(t)$) with its coefficients selected to minimize the RMS error, RMS(e[n]). To minimize the RMS(e[n]), we equate:

$$\frac{\partial}{\partial a_i}E[e^2[n]]=0 \qquad (9)$$

This yields:

$$\Sigma_{j=0}^{N}R_w[j-i]a*_j=R_{ws}[i], \qquad (10)$$

where:

$R_w[m]=E\{w[n]w[n+m]\}$ $R_{ws}[m]=E\{w[n]s[n+m]\}$

Figure 5:
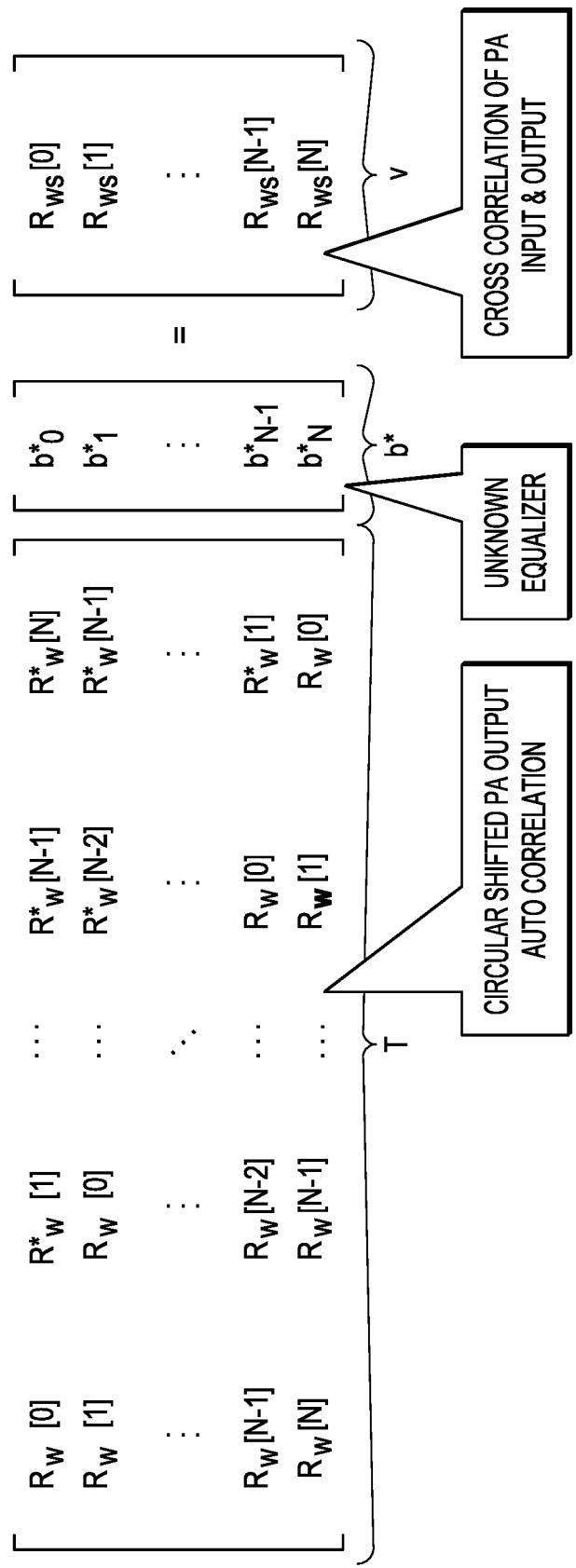
FIG. 5 illustrates a Yule-Walker equation for determining coefficients of a complex equalizer.

This can be written in matrix form as shown in FIG. 5. Here, $R_w[-k]=R_w^*[k]$, and $R_{sw}[k]=R_{ws}^*[-k]$. The matrix relationship shown in FIG. 5 is a Yule-Walker equation written as $T \cdot b=v$, where: T is a symmetric Toeplitz matrix, b is a vector of the equalization filter coefficients, and v is a cross-correlation vector of the (e.g., OFDM) input symbols and the (e.g., OFDM) output symbols. Solving for b to find the equalization filter coefficients, we find that $b=(T^{-1} \cdot v)^*$. Solving this equation does not require explicit matrix inversion, but instead it may be solved by a Levinson-Durbin recursion algorithm as is known in the art (see, e.g., https://en.wikipedia.org/wiki/Levinson_recursion).

As an alternative to the Yule-Walker-based equalization filter technique described above, in other embodiments a least squares technique is employed to determine the coefficients of the equalization filter. In that case, instead of forming a Toeplitz matrix T of the output auto correlations, instead a matrix R is formed of the output signal samples y(n), with each column being a 1-clock increased delayed version of the previous column. The filter coefficients are then given by $B=(R^H*R)-1*R^H*x$ where H is the Hermetian operation, and x is the ideal input signal vector. The estimated input signal, $x_{estimated}$, is then found as $x_{estimated}=R*b$, and the rest of the equations are the same as in the Yule-Walker technique.

Returning to FIG. 3, prior to equalization, beneficially the output symbols y(n) (e.g., of an OFDM signal) are time aligned with the input symbols x(n) (e.g., also an OFDM signal), the carrier phase of y(t) is de-rotated with respect to the carrier phase of x(t), and the symbols x(n) and y(n) are windowed in time.

Figure 6A:
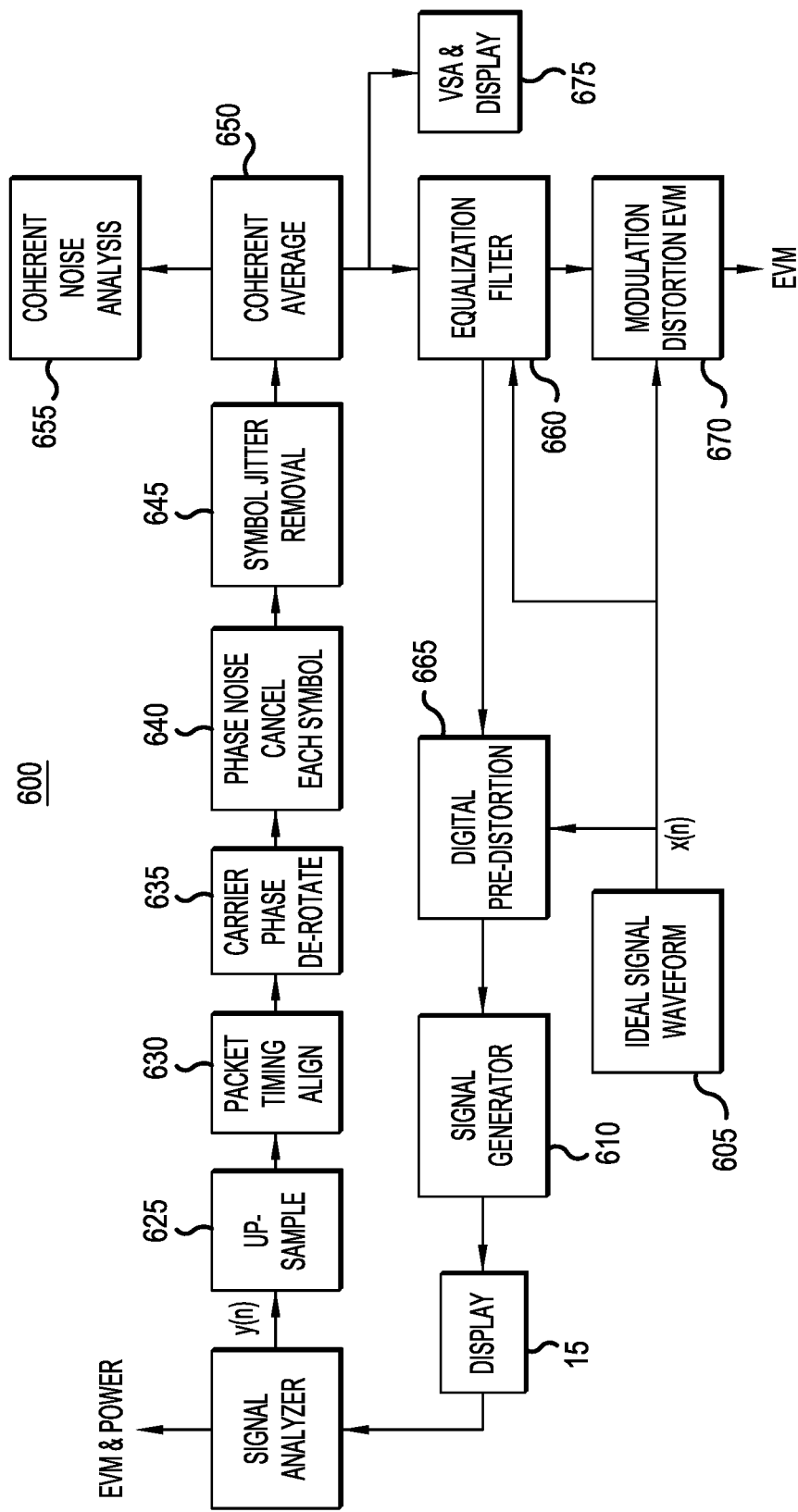
FIGS. 6A and 6B are a functional block diagrams of an arrangement for measuring EVM of a DUT.

FIG. 6A is a functional block diagram of an arrangement 600 for measuring the EVM of a DUT 15. The arrangement includes an ideal signal waveform 605, a signal generator 610 (e.g., signal generator 10 of FIG. 1), DUT 15, a signal analyzer 620 (e.g., signal analyzer 20 of FIG. 1), an up-sampler 625, a packet time aligner 630, a carrier phase de-rotator 635, a phase noise canceler 640, a symbol jitter remover 645, a coherent averager 650, a coherent noise analyzer 655, an equalization filter 660, a digital pre-distorter 665, a modulation distortion EVM evaluator 670, and a vector signal analyzer (VSA) and display 675.

Some of the functional blocks of FIG. 6A, such as up-sampler 625, packet time aligner 630, carrier phase de-rotator 635, phase noise canceler 640, symbol jitter remover 645, coherent averager 650, coherent noise analyzer 655, equalization filter 660, digital pre-distorter 665, modulation distortion EVM evaluator 670 and VSA 675 may be realized in whole or in part by a processing system such as processing system 2 described above with respect to FIG. 2, executing computer-readable instructions stored in memory (i.e., software). In some embodiments, ideal signal waveform 605 may be stored in memory or other data storage medium, for example associated with a processing system such as processing system 2 described above with respect to FIG. 2.

Figure 6B:
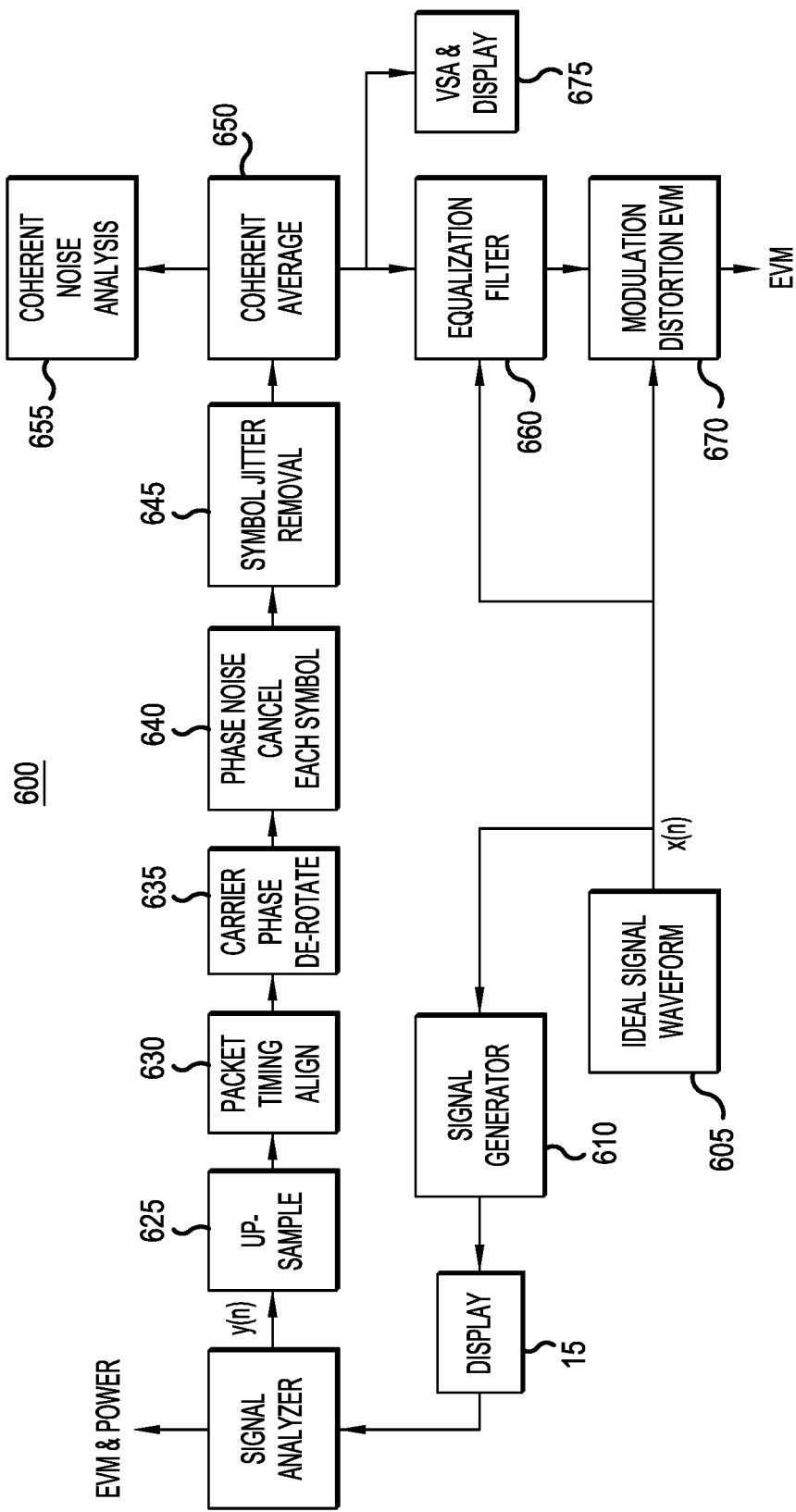

In some embodiments, some of the functional blocks shown in FIG. 6A, such as phase noise canceler 640, symbol jitter remover 645, and/or coherent averager 650, may be omitted for simplicity, with a possible corresponding loss in performance. In some embodiments, as illustrated in FIG. 6B, digital pre-distorter 665 may be omitted. In this case the ideal signal waveform 605 may be applied to signal generator 610 without pre-distortion. Otherwise, the embodiment of FIG. 6B is the same as that described above in connection with FIG. 6A, and thus further detailed description of FIG. 6B is omitted to avoid redundancy.

In some embodiments, the input signal x may include training symbols and a payload. For example, the input signal x may include 128 Channel Sounding OFDM Training Symbols with a 3 dB crest factor, followed by a regular signal under consideration for example an OFDM packet with 128 payload symbols with 256 QAM.

An example operation of arrangement 600 will now be provided. The input signal x (e.g., an OFDM signal) and the output signal y (e.g., also an OFDM signal) may be normalized and up-sampled using simple FFT and IFFT calculations, with zero insertion in the frequency domain. This improves signal alignment for subsequent time domain correlations. Also, the input signal x and the output signal y may be windowed in the time domain. Then, the correlations $R_{xx}$ and $R_{xy}$ are determined. Here, advantage may be taken of the fact that $R_{yx}=(Rxy)^*$ to use $R_{xy}$ instead of $R_{yx}$ when alignment is done using $R_{xy}$ based indices.

The output signal y is time-aligned to the input signal x, and then y is de-rotated by carrier phase de-rotator 635 using the maximum absolute value of the complex quantity $R_{xy}$, and then $R_{xy}$ is recomputed and updated. N significant samples (e.g., N=500) of $R_{yy}$ and $R_{xy}$ are maintained starting from zero-lag index, and the Toeplitz matrix is computed: $T=\text{Toeplitz}(R_{yy})$.

Samples of the output signal may have their phase noise canceled by phase noise canceler 640, their symbol jitter removed by symbol jitter remover 645, and may be coherently averaged by coherent averager 650, prior to being applied to equalization filter 660. Coherent averaging may reduce the noise floor of the output signal's frequency spectrum. Depending on the amount of averaging which is employed, in some cases the reduction may be 10 dB, 20 dB, or more (for example, averaging over 100 samples may lower the noise floor by 20 dB). In case the noise floor is reduced sufficiently by coherent averaging, then the EVM measurement system and method may measure the distortion component while rejecting the random noise component.

The coefficients of equalization filter 660 which produce a minimum mean square error (MMSE) are computed by inverting T, for example by using a Levinson-Durbin recursive algorithm: $b=(T^{-1} \cdot (Rxy)^*)^*$ Then the equalized response signal is computed: $x_{estimated}=\text{fftfilt}(b,y)$, and the distortion component d is computed as $d=x-x_{estimated}$. Here, equalization filter 660 may be a complex filter, and the filter coefficients may be complex valued.

Frequency selective EVM is computed over the occupied bandwidth of the output signal y by filtering d and x with an appropriate passband filter, before taking the ratio of their RMS values: $EVM=RMS(d)/RMS(x)$. EVM in the frequency domain is $EVM(f)=FFT(d)/FFT(x)$, which can be moving average filtered in the frequency domain to smoothen the curve.

Figure 7A:
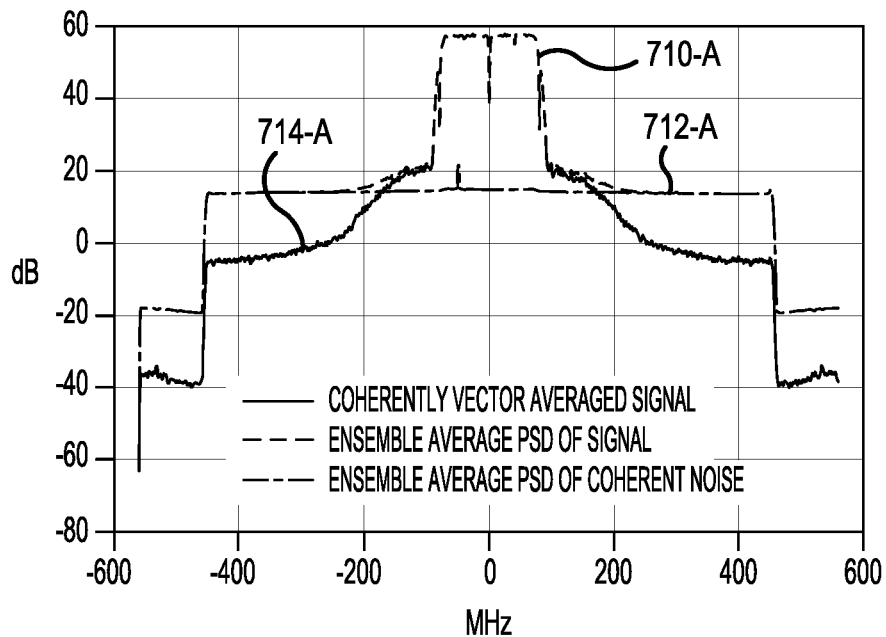
FIGS. 7A, 7B and 7C are three spectral plots illustrating an example of an effect that an equalizer may have on digital pre-distortion (DPD) for a DUT.
Figure 7B:
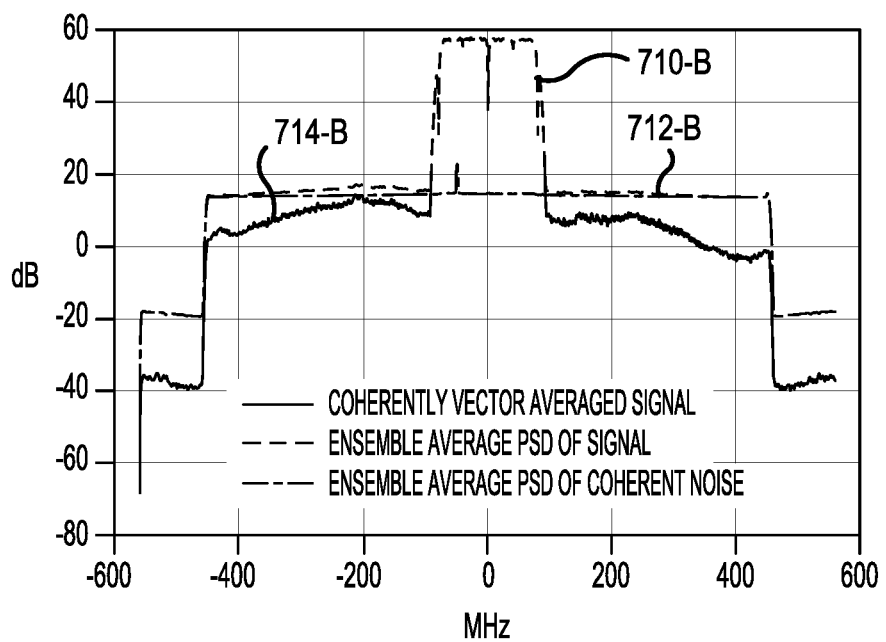
Figure 7C:
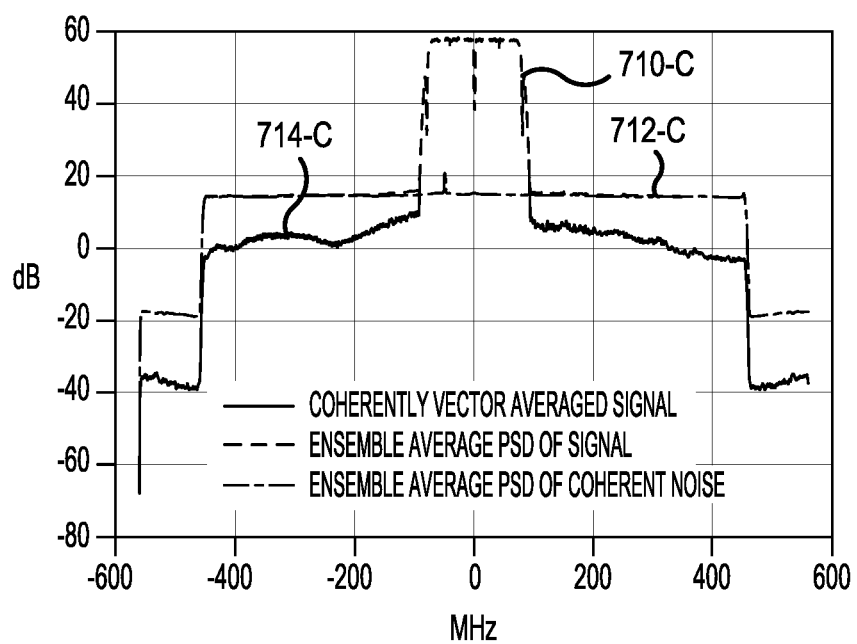

FIGS. 7A, 7B and 7C are three spectral plots illustrating an example of an effect that an equalizer may have on the power spectral density (PSD) of an output signal y of a DUT when digital pre-distortion (DPD) is employed. In all of these plots, it is assumed that coherent averaging is applied to the output signal y, which reduces the noise floor.

FIG. 7A shows various example PSDs in a case where no digital pre-distortion (DPD) is applied to the input signal x(n). For example, with respect to FIG. 6B, FIG. 7A illustrates an example of a case where the ideal signal waveform 605 is applied to signal generator 610 without pre-distortion (i.e., (e.g., digital pre-distorter 665 of FIG. 6A is omitted, as mentioned above). Here, plot 710-A shows the ensemble average PSD of the signal, plot 712-A shows the ensemble average PSD of the coherent noise, and plot 714-A shows the PSD of the coherently vector-averaged signal.

FIG. 7B shows various example PSDs in a case where DPD (e.g., digital pre-distorter 665) is applied to the same input signal x(n) as in FIG. 7A, but no equalization filter is employed (e.g., equalization filter 660 is omitted). Plot 710-B shows the ensemble average PSD of the signal, plot 712-B shows the ensemble average PSD of the coherent noise, and plot 714-B shows the PSD of the coherently vector-averaged signal. Here it can be seen that the application of DPD has degraded the out of band spectrum for the coherently vector-averaged signal.

FIG. 7C shows various example PSDs in a case where DPD is applied to the same input signal as in FIG. 7A, and an equalization filter (e.g., equalization filter 660 of FIG. 6A) is employed, as described above. Plot 710-C shows the ensemble average PSD of the signal, plot 712-C shows the ensemble average PSD of the coherent noise, and plot 714-C shows the PSD of the coherently vector-averaged signal. Comparing plot 714-C to plot 714-B, it can be seen that the equalization filter has improved the out of band spectrum for the coherently vector-averaged signal in a case where DPD is applied to the input signal. More specifically, equalization filter 660 may be employed for reducing out-of-band spectral regrowth caused by digital pre-distorter 665.

Figure 8:
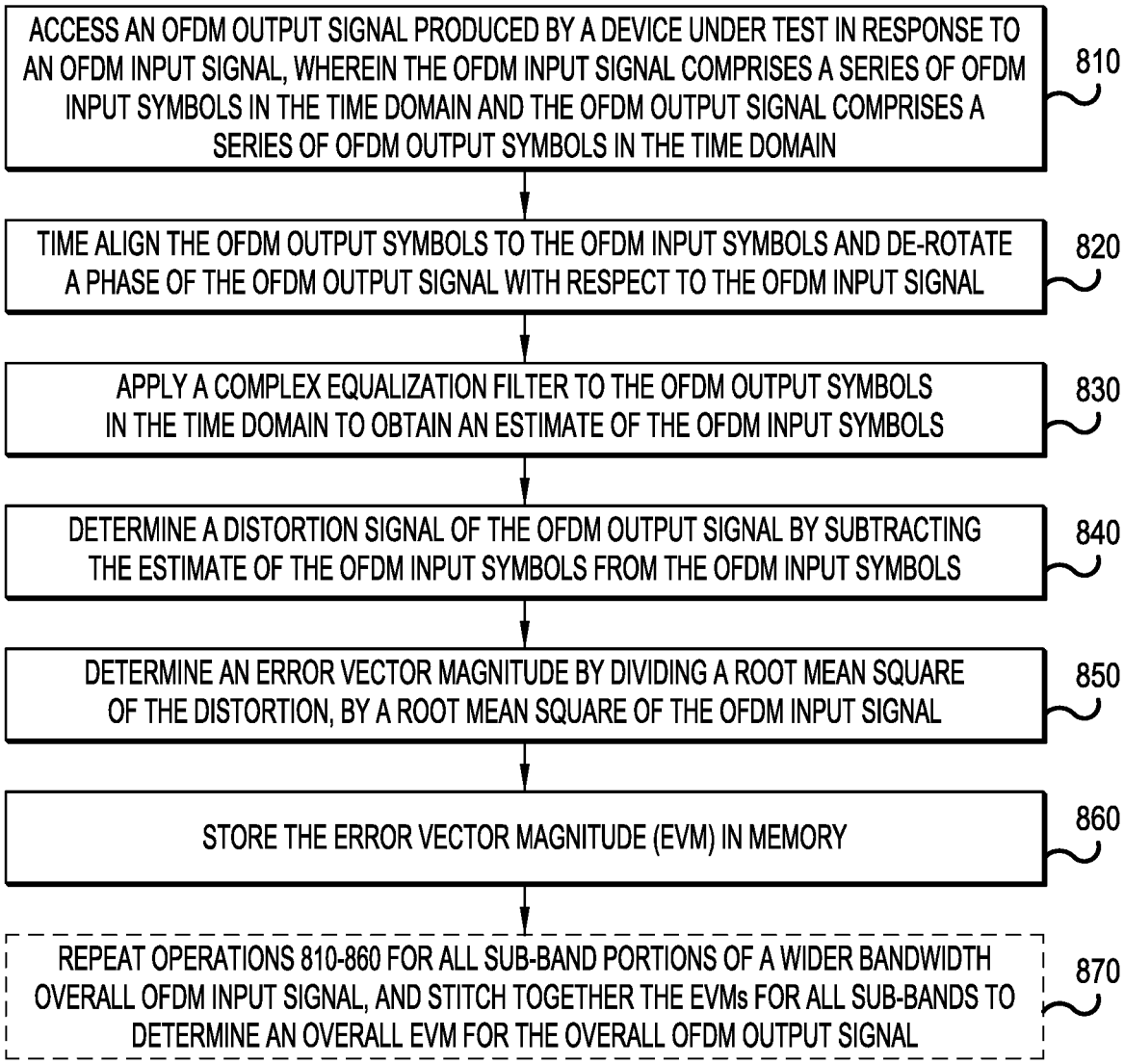
FIG. 8 is a flowchart of an example embodiment of a method of measuring an EVM for a DUT.

FIG. 8 is a flowchart of an example embodiment of a method 800 of measuring an EVM for a DUT.

An operation 810 includes accessing an output signal (e.g., an OFDM output signal) produced by a device under test (DUT) in response to an input signal (e.g., an OFDM input signal), wherein the OFDM input signal comprises a series of OFDM input symbols in the time domain and the OFDM output signal comprises a series of OFDM output symbols in the time domain. In some embodiments, a processor such as processor 100 of FIG. 2 may access the OFDM output symbols by reading them from a memory device where they have been temporarily stored for processing.

An operation 820 includes time aligning the OFDM output symbols to the OFDM input symbols and de-rotating a phase of the OFDM output signal with respect to the OFDM input signal, ensuring that the input and output modulated complex signals are aligned in both time and phase.

An operation 830 includes applying a complex equalization filter to the OFDM output symbols in the time domain to obtain an estimate of the OFDM input symbols. In some embodiments, the complex equalization filter is a Yule-Walker filter. In other embodiments, the complex equalization filter is a least squares filter. Beneficially, the coefficients of the complex equalization filter are adapted based on the OFDM input symbols and OFDM output symbols to produce a minimum mean square error (MMSE) between the ideal input symbols and the estimate of the OFDM input symbols which is produced based on the output symbols and the equalization filter.

An operation 840 includes determining a distortion signal of the OFDM output signal by subtracting the estimate of the OFDM input symbols from the OFDM input symbols.

An operation 850 includes determining an error vector magnitude (EVM) by dividing a root mean square (RMS) of the distortion, by an RMS of the OFDM input signal.

An operation 860 includes storing the determined EVM in memory. Operation 860 may also include displaying the EVM to a user on a display device, or communicating the EVM, for example via a wireless connection (WiFi, Bluetooth, etc.) and/or via an Internet connection.

In some embodiments, the OFDM input signal of operation 810 is disposed in a first input sub-band portion of a wider bandwidth overall OFDM input signal which includes at least the first input sub-band portion and a second input sub-band portion (and may include one or more additional input sub-band portions), and the OFDM output signal of operation 810 is disposed in a first output sub-band portion of a wider bandwidth overall OFDM output signal which includes at least the first output sub-band portion and a second output sub band-portion (and may include one or more additional output sub-band portions). In that case, method 800 may optionally include an operation 870.

Operation 870 includes repeating operations 810-860 for all sub-band portions of the wider bandwidth overall OFDM input signal, and stitching together the EVMs for all sub-bands to determine an overall EVM for the overall OFDM output signal.

In a case where the complex equalization filter is a Yule-Walker filter, the method 800 may include an additional operation of determining filter coefficients of the Yule-Walker filter which minimize a mean square error that is the distortion signal. In that case, in some embodiments the method includes determining filter coefficients of the Yule-Walker filter by solving a matrix equation $b=(T^{-1}*v)$, where v is cross-correlation vector of the OFDM input symbols and the OFDM output symbols, where T is a Toeplitz matrix of an autocorrelation vector of the OFDM output symbols, and where b is a vector comprising the filter coefficients of the complex equalization filter. In some embodiments, solving the matrix equation $b=(T^{-1}*v)$ includes the processor determining $T^{-1}$ from the Toeplitz matrix T by applying a Levinson-Durbin recursive algorithm.

In a case where the complex equalization filter is a least squares filter, the method 800 may further include an additional operation of determining filter coefficients of the least squares filter which minimize a mean square error of the distortion signal. In that case, in some embodiments the method includes determining filter coefficients of the least square filter by solving a matrix equation of the form: $b=(R^H*R)^{-1}*R^H*x$, where x is a vector of the OFDM input symbols; R is a matrix of the OFDM output symbols, with each column in R being a one-clock increased delayed version of the immediately previous column; where H indicates the Hermitian operation; and where b is a vector comprising the filter coefficients of the least squares filter.

In some embodiments, method 800 have include an additional operation of nulling out unused tones in the OFDM input symbols and the estimated OFDM input symbols prior to determining the distortion signal of the OFDM output signal.

In some embodiments, method 800 may include one or more of the following additional operations prior to applying the complex equalization filter to the OFDM output symbols: canceling phase noise for each OFDM output symbol; removing jitter from each OFDM output symbol; and coherently averaging the OFDM output symbols over time using repeated copies of the OFDM output signal.

In some embodiments, some or all of the operations 810-870, and/or the various other operations described above, may be performed by a processing system comprising a processor and memory, for example the processing system 2 of FIG. 1, executing computer-readable instructions which are stored in memory. In some cases, those computer-readable instructions may be stored on a tangible non-volatile storage medium, such as disc 136 of FIG. 2.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method, comprising:
utilizing a processor and memory to:
access an orthogonal frequency division multiplexed (OFDM) output signal produced by a device under test (DUT) in response to an OFDM input signal, wherein the OFDM input signal comprises a series of OFDM input symbols in a time domain and the OFDM output signal comprises a series of OFDM output symbols in the time domain;
time align the OFDM output symbols to the OFDM input symbols and de-rotate a phase of the OFDM output signal with respect to the OFDM input signal;
apply a complex equalization filter to the OFDM output symbols in the time domain to obtain an estimate of the OFDM input symbols;
determine a distortion signal of the OFDM output signal by subtracting the estimate of the OFDM input symbols from the OFDM input symbols;
determine an error vector magnitude (EVM) by dividing a root mean square of the distortion, by a root mean square of the OFDM input signal; and
store the EVM in the memory.

2. The method of claim 1, wherein the complex equalization filter is a Yule-Walker filter, and wherein the method further comprises the processor determining filter coefficients of the Yule-Walker filter which minimize a mean square error that is the distortion signal.

3. The method of claim 2, wherein determining filter coefficients of the Yule-Walker filter comprises the processor solving a matrix equation $b=(T^{-1}*v)$, where v is cross-correlation vector of the OFDM input symbols and the OFDM output symbols, where T is a Toeplitz matrix of an autocorrelation vector of the OFDM output symbols, and where b is a vector comprising the filter coefficients of the complex equalization filter.

4. The method of claim 3, wherein the processor solving the matrix equation $b=(T^{-1}*v)$ includes the processor determining $T^{-1}$ from the Toeplitz matrix T by applying a Levinson-Durbin algorithm.

5. The method of claim 1, wherein the complex equalization filter is a least squares filter and wherein the method further comprises the processor determining filter coefficients of the least squares filter which minimize a mean square error of the distortion signal.

6. The method of claim 5, wherein determining the filter coefficients of the least squares filter comprises the processor solving a matrix equation of the form:

$$b=(R^H*R)^{-1}*R^H*x$$

where x is a vector of the OFDM input symbols; R is a matrix of the OFDM output symbols, with each column in R being a one-clock increased delayed version of an immediately previous column; where H indicates a Hermitian operation; and where b is a vector comprising the filter coefficients of the least squares filter.

7. The method of claim 1, further comprising the processor nulling out unused tones in the OFDM input symbols and the estimated OFDM input symbols prior to determining the distortion signal of the OFDM output signal.

8. The method of claim 1, further comprising the processor, prior to applying the complex equalization filter to the OFDM output symbols:
canceling phase noise for each OFDM output symbol;
removing jitter from each OFDM output symbol; and
coherently averaging the OFDM output symbols over time using repeated copies of the OFDM output signal.

9. The method of claim 1, wherein the OFDM input signal is disposed in a first input sub-band portion of a wider bandwidth overall OFDM input signal which includes at least the first input sub-band portion and a second input sub-band portion, and wherein the OFDM output signal is disposed in a first output sub-band portion of a wider bandwidth overall OFDM output signal which includes at least the first output sub-band portion and a second output sub-band portion,
the method further comprising:
determining a second EVM for a second OFDM output signal in the second output sub-band portion, and
stitching together the EVM and the second EVM to determine an overall EVM for the overall OFDM output signal.

10. The method of claim 1, further comprising applying pre-distortion to the OFDM input signal prior to applying the OFDM input signal to the DUT, wherein the complex equalization filter reduces out of band spectral regrowth of the OFDM output signal due to the pre-distortion.

11. An apparatus, comprising:
an input terminal configured to receive an orthogonal frequency division multiplexed (OFDM) output signal produced by a device under test (DUT) in response to an OFDM input signal, wherein the OFDM input signal comprises a series of OFDM input symbols in a time domain and the OFDM output signal comprises a series of OFDM output symbols in the time domain;
a processor configured to:
access the OFDM output signal;
time align the OFDM output symbols to the OFDM input symbols and de-rotate a phase of the OFDM output signal with respect to the OFDM input signal;
apply a complex equalization filter to the OFDM output symbols in the time domain to obtain an estimate of the OFDM input symbols;
determine a distortion signal of the OFDM output signal by subtracting the estimate of the OFDM input symbols from the OFDM input symbols;
determine an error vector magnitude (EVM) by dividing a root mean square of the distortion, by a root mean square of the OFDM input signal; and
store the EVM in a memory.

12. The apparatus of claim 11, wherein the complex equalization filter is a Yule-Walker filter, and wherein the processor is further configured to determine filter coefficients of the Yule-Walker filter which minimize a mean square error of the distortion signal.

13. The apparatus of claim 12, wherein the processor is further configured to determine filter coefficients of the Yule-Walker filter by solving a matrix equation:
$b=(T^{-1}*v)$, where v is cross-correlation vector of the OFDM input symbols and the OFDM output symbols, where T is a Toeplitz matrix of an autocorrelation vector of the OFDM output symbols, and where b is a vector comprising the filter coefficients of the complex equalization filter.

14. The apparatus of claim 11, wherein the complex equalization filter is a least squares filter and wherein the processor is configured to determine filter coefficients of the least squares filter which minimize a mean square error of the distortion signal.

15. The apparatus of claim 14, wherein the processor is further configured to determine the filter coefficients of the least squares filter by solving a matrix equation of the form:

$$b=(R^H*R)^{-1}*R^H*x$$

where x is a vector of the OFDM input symbols; R is a matrix of the OFDM output symbols, with each column in R being a one-clock increased delayed version of an immediately previous column; where H indicates a Hermitian operation; and where b is a vector comprising the filter coefficients of the least squares filter.

16. The apparatus of claim 11, wherein the processor is further configured to null out unused tones in the OFDM input symbols and the estimated OFDM input symbols prior to determining the distortion signal of the OFDM output signal.

17. The apparatus of claim 11, wherein the processor is further configured to, prior to applying the complex equalization filter to the OFDM output symbols:
cancel phase noise for each OFDM output symbol;
remove jitter from each OFDM output symbol; and
coherently average the OFDM output symbols over time using repeated copies of the OFDM output signal.

18. The apparatus of claim 11, further comprising:
a signal generator which is configured to generate the input OFDM signal and provide the input OFDM signal to the DUT; and
a display which is configured to display the EVM.

19. The apparatus of claim 11,
wherein the OFDM input signal is disposed in a first input sub-band portion of a wider bandwidth overall OFDM input signal which includes at least the first input sub-band portion and a second input sub-band portion,
wherein the OFDM output signal is disposed in a first output sub-band portion of a wider bandwidth overall OFDM output signal which includes at least the first output sub-band portion and a second output sub-band portion, and
wherein the processor is further configured to:
determine a second EVM for a second OFDM output signal in the second output sub-band portion, and
stitch together the EVM and the second EVM to determine an overall EVM for the overall OFDM output signal.

20. The apparatus of claim 11, wherein pre-distortion is applied to the OFDM input signal prior to applying the OFDM input signal to the DUT, wherein the complex equalization filter reduces out of band spectral regrowth of the OFDM output signal due to the pre-distortion.

* * * * *